United States Patent
Willhalm et al.

(10) Patent No.: US 10,481,958 B2
(45) Date of Patent: Nov. 19, 2019

(54) SPECULATIVE EXECUTION TAG FOR ASYNCHRONOUS DRAM REFRESH

(71) Applicant: Intel IP Corporation, Santa Clara, CA (US)

(72) Inventors: Thomas Willhalm, Sandhausen (DE); Karthik Kumar, Chandler, AZ (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/858,732

(22) Filed: Dec. 29, 2017

(65) Prior Publication Data

US 2019/0042333 A1 Feb. 7, 2019

(51) Int. Cl.
  *G06F 12/00* (2006.01)
  *G06F 9/52* (2006.01)
  *G06F 12/128* (2016.01)
  *G06F 12/0831* (2016.01)
  *G06F 12/0804* (2016.01)
  *G06F 12/0868* (2016.01)

(52) U.S. Cl.
  CPC .......... *G06F 9/528* (2013.01); *G06F 12/0804* (2013.01); *G06F 12/0831* (2013.01); *G06F 12/0868* (2013.01); *G06F 12/128* (2013.01); *G06F 2212/621* (2013.01)

(58) Field of Classification Search
  CPC .... G06F 9/528; G06F 12/128; G06F 12/0831; G06F 12/0804; G06F 12/0868; G06F 2212/621
  See application file for complete search history.

(56) References Cited

U.S. PATENT DOCUMENTS

| | | | |
|---|---|---|---|
| 5,519,831 A * | 5/1996 | Holzhammer | G06F 11/1441 365/228 |
| 9,547,594 B2 | 1/2017 | Willhalm | |
| 9,792,224 B2 | 10/2017 | Kumar et al. | |
| 2013/0019083 A1* | 1/2013 | Cain, III | G06F 11/1492 712/203 |
| 2014/0075086 A1 | 3/2014 | Banikazemi | |
| 2016/0054942 A1* | 2/2016 | Yu | G06F 1/30 714/718 |
| 2016/0179667 A1 | 6/2016 | Kumar et al. | |
| 2017/0109295 A1 | 4/2017 | Lasperas et al. | |

OTHER PUBLICATIONS

Oukid et al., "FPTree: A Hybrid SCM-DRAM Persistent and Concurrent B-Tree for Storage Class Memory", Proceeding for SIGMOD '16 Proceedings of the 2016 International Conference on Management of Data, 2016, pp. 371-386, ACM, San Francisco, CA.
Hasso Plattner, "The Impact of Intel's Haswell Architecture on SAP's HANA (SP10)", <blogs.saphana.com/2015/06/29/impact-of-haswell-on-hana/>, Jun. 29, 2015, 12 pages.
Extended European Search Report for European Patent Application No. 18209323.7, dated May 29, 2019, 6 pages.

* cited by examiner

*Primary Examiner* — Kalpit Parikh
(74) *Attorney, Agent, or Firm* — Jordan IP Law, LLC

(57) ABSTRACT

An embodiment of a semiconductor package apparatus may include technology to track a modification to a processor cache line, and set an indicator to indicate if the modification relates to a transaction. Other embodiments are disclosed and claimed.

16 Claims, 5 Drawing Sheets

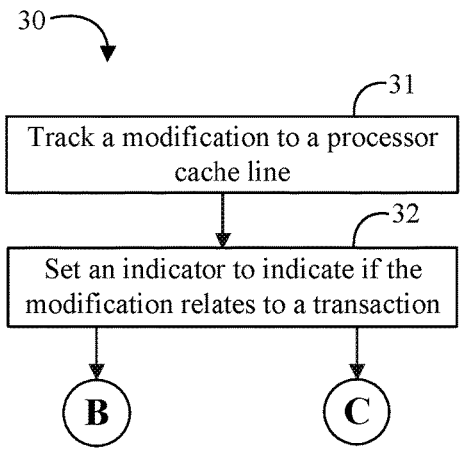
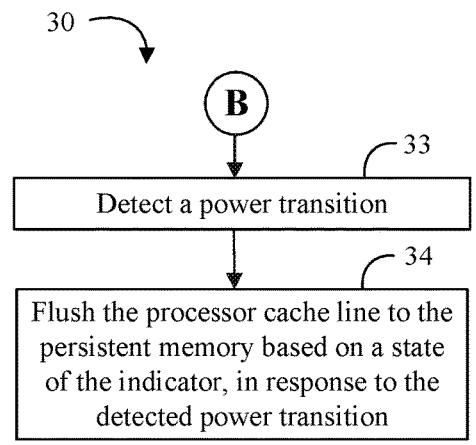
FIG. 3A
FIG. 3B
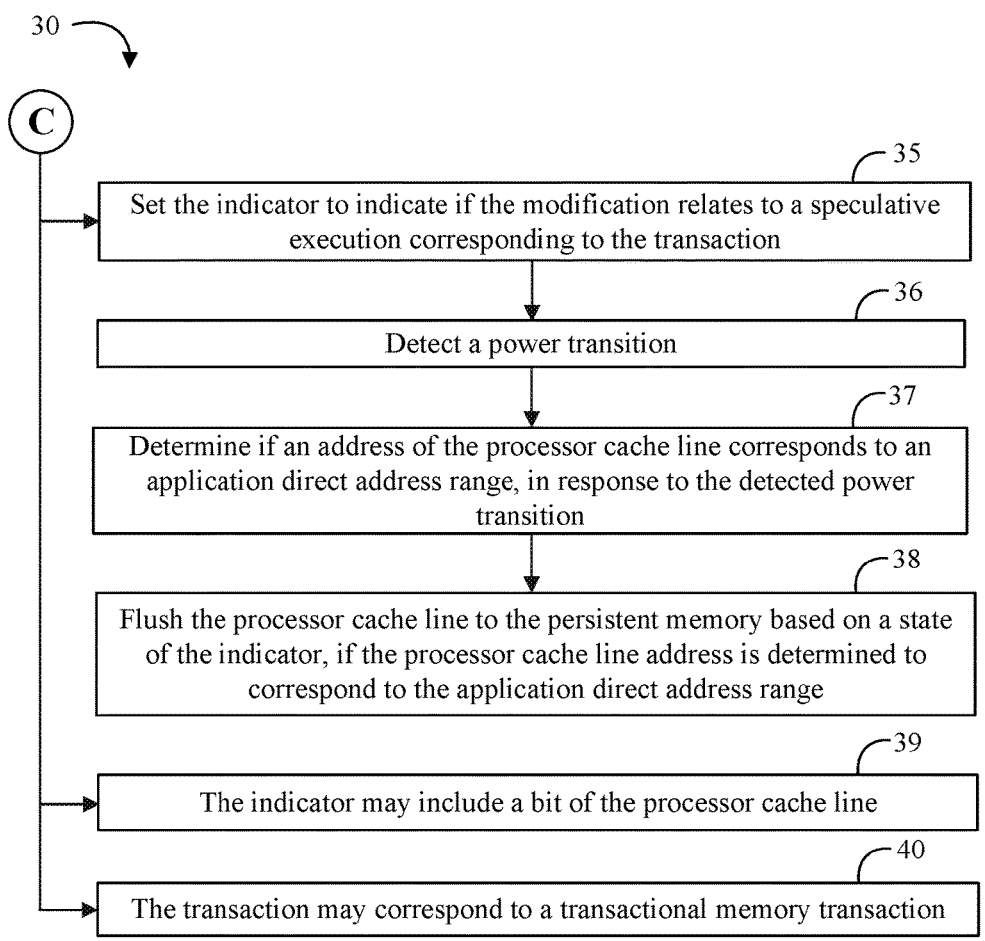
FIG. 3C

SPECULATIVE EXECUTION TAG FOR ASYNCHRONOUS DRAM REFRESH

TECHNICAL FIELD

Embodiments generally relate to memory systems. More particularly, embodiments relate to a speculative execution tag for asynchronous dynamic random access memory (DRAM) refresh.

BACKGROUND

Asynchronous DRAM refresh (ADR) refers to DRAM self-refresh which may help keep data in a safe state in the event of power loss. For example, some devices may support ADR where the device triggers a hardware interrupt to the memory controller to flush write-protected data buffers and place the DRAM in self-refresh. The DRAM may then be backed up to flash memory.

BRIEF DESCRIPTION OF THE DRAWINGS

The various advantages of the embodiments will become apparent to one skilled in the art by reading the following specification and appended claims, and by referencing the following drawings, in which:

FIGS. 3A to 3C are flowcharts of an example of a method of tracking a cache line modification according to an embodiment;

DESCRIPTION OF EMBODIMENTS

Various embodiments described herein may include a memory component and/or an interface to a memory component. Such memory components may include volatile and/or nonvolatile memory. Nonvolatile memory may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In particular embodiments, a memory component with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory may be a storage medium that requires power to maintain the state of data stored by the medium. Non-limiting examples of volatile memory may include various types of RAM, such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Figure 1:
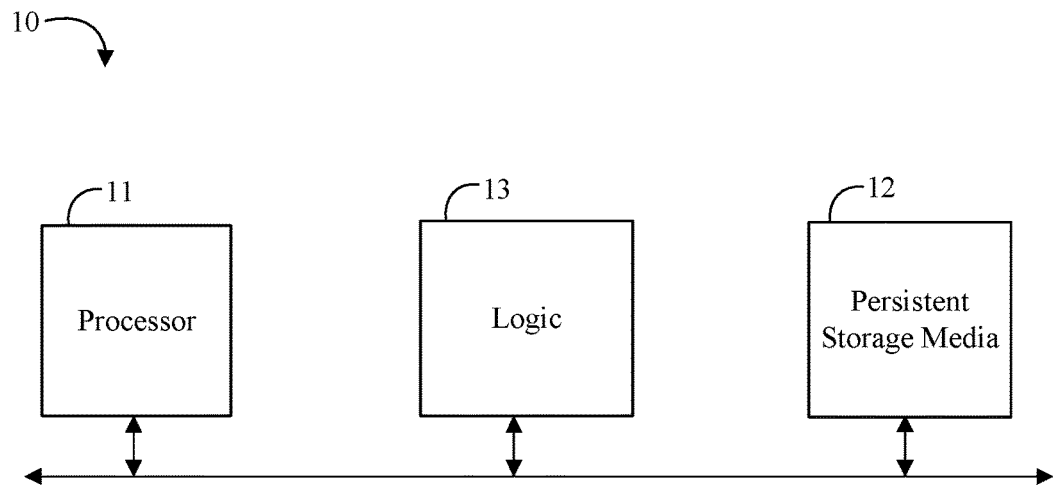
FIG. 1 is a block diagram of an example of an electronic processing system according to an embodiment.

Turning now to FIG. 1, an embodiment of an electronic processing system 10 may include a processor 11, persistent memory 12 communicatively coupled to the processor 11, and logic 13 communicatively coupled to the processor 11 to track a modification to a cache line of the processor 11, and set an indicator to indicate if the modification relates to a transaction. In some embodiments, the logic 13 may be further configured to detect a power transition, and flush the processor cache line to the persistent memory 12 based on a state of the indicator, in response to the detected power transition. For example, the logic 13 may be configured to set the indicator to indicate if the modification relates to a speculative execution corresponding to the transaction. In some embodiments, the logic 13 may be further configured to detect a power transition, determine if an address of the processor cache line corresponds to an application direct address range, in response to the detected power transition, and flush the processor cache line to the persistent memory based on a state of the indicator, if the processor cache line address is determined to correspond to the application direct address range. For example, the indicator may comprise a bit of the processor cache line, and/or the transaction may correspond to a transactional memory transaction. In some embodiments, the logic 13 may be located in, or co-located with, various components, including the processor 11 (e.g., on a same die).

Embodiments of each of the above processor 11, persistent memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the persistent memory 12, other persistent storage media, or other system memory may store a set of instructions which when executed by the processor 11 cause the system 10 to implement one or more components, features, or aspects of the system 10 (e.g., the logic 13, tracking a modification to a processor cache line, setting an indicator to indicate if the modification relates to a transaction, etc.).

Figure 2:
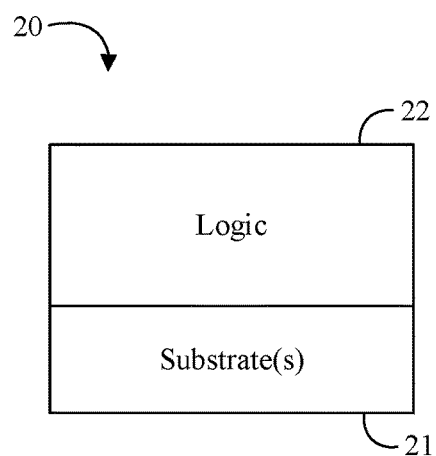
FIG. 2 is a block diagram of an example of a semiconductor package apparatus according to an embodiment.

Turning now to FIG. 2, an embodiment of a semiconductor package apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to track a modification to a processor cache line, and set an indicator to indicate if the modification relates to a transaction. In some embodiments, the logic 22 may be further configured to detect a power transition, and flush the processor cache line to the persistent memory based on a state of the indicator, in response to the detected power transition. For example, the logic 22 may be configured to set the indicator to indicate if the modification relates to a speculative execution corresponding to the transaction. In some embodiments, the logic 22 may be further configured to detect a power transition, determine if an address of the processor cache line corresponds to an application direct address range in response to the detected power transition, and flush the processor cache line to the persistent memory based on a state of the indicator, if the processor cache line address is determined to correspond to the application direct address range. For example, the indicator may comprise a bit of the processor cache line, and/or the transaction may correspond to a transactional memory transaction. In some embodiments, the logic 22 coupled to the one or more substrates 21 may include transistor channel regions that are positioned within the one or more substrates.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 20 may implement one or more aspects of the method 30 (FIGS. 3A to 3C), the method 70 (FIG. 7), or any of the embodiments discussed herein. The illustrated apparatus 20 includes one or more substrates 21 (e.g., silicon, sapphire, gallium arsenide) and logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Turning now to FIGS. 3A to 3C, an embodiment of a method 30 of tracking a cache line modification may include tracking a modification to a processor cache line at block 31, and setting an indicator to indicate if the modification relates to a transaction at block 32. Some embodiments of the method 30 may further include detecting a power transition at block 33, and flushing the processor cache line to the persistent memory based on a state of the indicator, in response to the detected power transition, at block 34. Additionally, or alternatively, some embodiments of the method 30 may include setting the indicator to indicate if the modification relates to a speculative execution corresponding to the transaction at block 35. For example, the method 30 may also include detecting a power transition at block 36, determining if an address of the processor cache line corresponds to an application direct address range, in response to the detected power transition, at block 37, and flushing the processor cache line to the persistent memory based on a state of the indicator, if the processor cache line address is determined to correspond to the application direct address range, at block 38. For example, the indicator may include a bit of the processor cache line at block 39, and/or the transaction may correspond to a transactional memory transaction at block 40.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 19 to 24 below. Embodiments or portions of the method 30 may be implemented in firmware, applications (e.g., through an application programming interface (API)), or driver software running on an operating system (OS).

Figure 4:
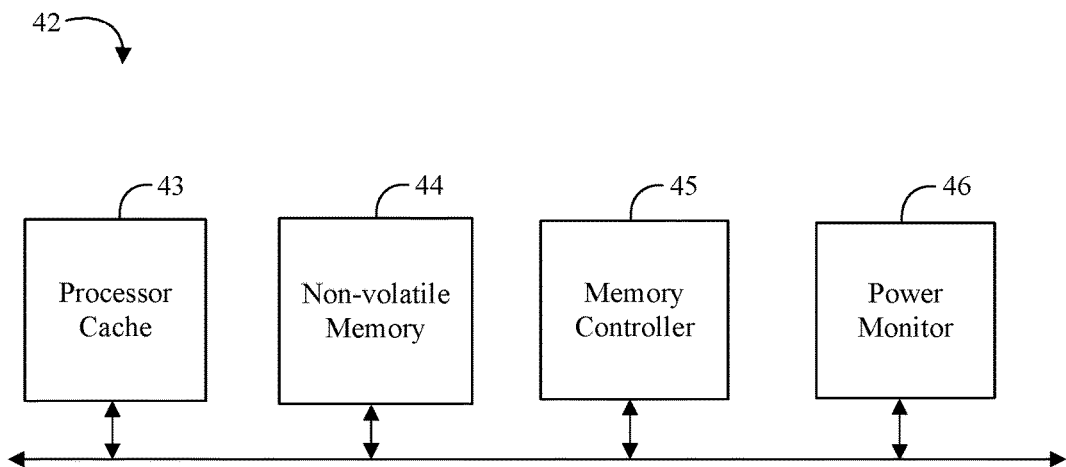
FIG. 4 is a block diagram of an example of memory apparatus according to an embodiment.

Turning now to FIG. 4, an embodiment of a memory apparatus 42 may include a processor cache 43, non-volatile memory (NVM) 44, a memory controller 45, and a power monitor 46. For example, the NVM 44 may include 3D crosspoint technology (e.g., INTEL 3D XPOINT technology). The memory controller 45 may include technology to track modifications to the processor cache 43 (e.g., on a per cache line basis), and to set indicators to indicate if the modifications relate to a transaction (e.g., on a per cache line basis). The power monitor 46 may include technology to detect a power transition (e.g., a loss of power), and the memory controller 45 may be configured to flush the processor cache 43 to the NVM 44 based on respective states of the indicators, in response to the detected power transition.

In some embodiments, the memory controller 45 may be configured to set the indicators to indicate if the modifications relate to speculative execution corresponding to one or more transactions. If the power monitor 46 detects a power loss, the memory controller 45 may determine if an address of a processor cache line corresponds to an application direct address range and, if so, flush the processor cache line to the NVM 44 based on a state of the indicator (e.g., if the state indicates that the cache line was not modified by a speculative execution during the transaction). For example, the indicator may comprise a bit of the processor cache line, and/or the transaction may correspond to a transactional memory transaction. For example, a processor may speculatively execute instructions and speculatively modify data in the processor cache 43. Advantageously, in some embodiments the speculative cache entries are not flushed to the NVM 44 by ADR unless the transaction is completed (e.g., based on the respective state of the indicators).

Embodiments of the processor cache 43, the NVM 44, the memory controller 45, the power monitor 46, and other components of the memory apparatus 42, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Some embodiments may advantageously provide technology to handle speculative execution in ADR domains. Some embodiments may be beneficial for utilizing both persistent storage media, such as phase change memory with switch (PCMS) technology, INTEL 3DXPOINT technology, etc., together with transactional memory, such as INTEL transaction synchronization extensions (TSX) technology. In some embodiments, these two technologies may be utilized in a server platform for compelling database applications. Some transactional memory technology may enable multiple threads to move forward with speculative execution of code in critical sections (e.g., locked regions to make changes to a database table) with the ability to roll back this speculative execution if there is a true data conflict. Such speculative execution may provide substantial performance improvements for some database applications. Some persistent memory technology may enable applications to write directly to memory (e.g., an application direct mode for 3D crosspoint memory may allow an application to update data in memory) and the change may be considered durable and permanent because the memory is persistent.

For some other systems, these technologies may be somewhat incompatible with respect to writes to memory being speculative versus persistent. Some other systems may not allow persistent writes inside a transaction because of such incompatibility. In these other systems, cache line flushes and non-temporal writes, which bypass the cache, may result in immediate abortion of transactions. For example, a transaction being speculatively executed may involve a table stored in persistent memory. The transactional memory may rely on the change not being durable so the change may be rolled back, or undone, in the case of a true data conflict. Persistent memory on the other hand, by definition, makes the change durable and permanent. Some embodiments may advantageously provide technology to enable utilizing both transactional memory and persistent memory simultaneously which may be beneficial for database applications and other applications. Some embodiments may also improve performance by reducing the overhead of a software implementation that combines transactional with persistent memory data structures.

In some embodiments, ADR technology may be extended to processor cache memories. For example, the processor cache may be power-protected to enable writes from the processor cache to persistent memory. In the event of a power failure, for example, the processor cache may be flushed to persistent memory using the energy from a dedicated capacitor. Some embodiments may advantageously not flush cache lines that have been modified during a transaction. For example, some embodiments may provide a speculative tracking bit using a tag in the processor cache. The tag may also be used to track the cache line of a transaction. Upon power failure, the speculative tracking bit may be consulted before flushing the data. Some transactional memory technology may utilize the processor cache to enable speculative execution that may be rolled back by hardware. In some embodiments, the processor cache may utilize volatile memory and each cache line may include a tag to track modified cache lines (e.g., via speculative execution), which may be discarded in the event of a data conflict and which do not need to be flushed in the event of a power loss.

Figure 5:
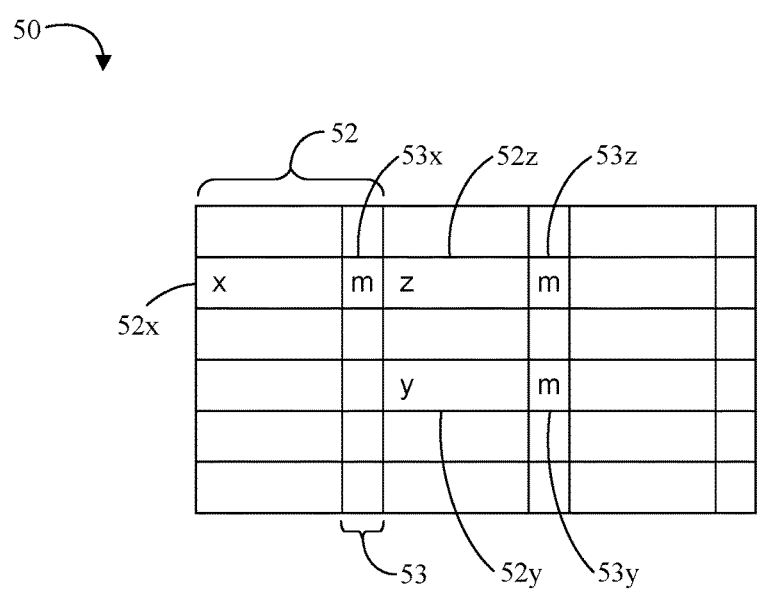
FIG. 5 is an illustrative diagram of an example of a processor cache according to an embodiment.

Turning now to FIG. 5, an embodiment of a processor cache 50 may include a plurality of cache lines 52. An illustrative modification to the processor cache 50 may be represented as follows:

```
XBEGIN
    <modify data>
    write x
    write y
    write z
XEND
```

The writes to the processor cache 50 may result in corresponding entries in respective cache lines 52x, 52y, and 52z. Each of the cache lines 52 may include associated metadata 53. Some embodiments may advantageously track modified cache lines during a transaction and set the associated metadata 53x, 53y, and 53z to indicate that the corresponding cache lines 52x, 52y, and 53z were modified during the transaction. In case of a conflict, these modifications may be discarded by invalidating the tagged cache lines. In the event of a power failure, the metadata 53 may be consulted to determine whether or not the associated cache lines 52 should be flushed.

Some embodiments may include persistent memory and may utilize ADR to handle power failures. For example, a write may be posted by an application where the application may complete a write to the persistent memory and consider the change made to a table. However, this write may be stored in the memory controller buffers, for example, and not have yet reached persistent memory. If there is a power failure at this point, the application may have an inconsistent state where the application considers the change to have been made to the table, but in the system, the old value is still stored in the persistent memory while the change is only in the memory controller buffer. ADR technology may handle this situation by providing sufficient capacitive power for the memory controller buffers to flush the cache contents to the persistent memory after a power failure.

Some other systems may include ADR technology only in the memory controller domain and not for the processor caches. In those systems, the applications are responsible for manually flushing the data from the processor caches at regular intervals. Some embodiments may extend ADR technology to processor caches. Advantageously, some embodiments may distinguish processor cache lines modified from speculative execution using a speculative metadata bit. The cache lines with the speculative metadata bit set may not be flushed in case of a power failure and the data that resides in the persistent memory may not include any modifications from the transactional region, as if the corresponding transactions never happened.

Figure 6:
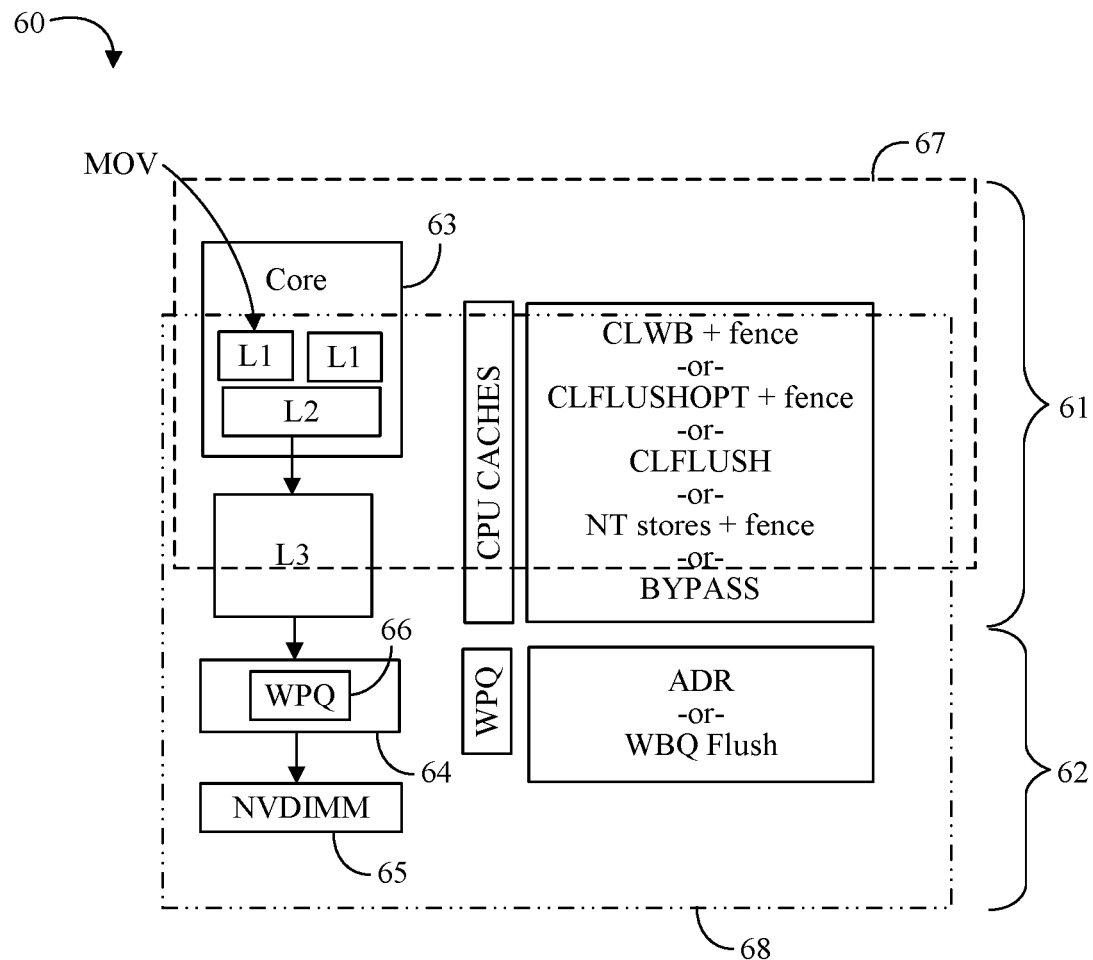
FIG. 6 is a block diagram of another example of an electronic processing system according to an embodiment.

Turning now to FIG. 6, an embodiment of an electronic processing system 60 may include a processor subsystem 61 and a memory subsystem 62. The processor subsystem 61 may include a central processor unit (CPU) core 63 and a multi-level cache including, for example, a level one CPU cache (L1), a level two CPU cache (L2), and a level three CPU cache (L3). The L1 and L2 CPU caches may be located within the CPU core 63. The memory subsystem 62 may include a memory controller 64 and one or more persistent memory devices 65 such as non-volatile dual-inline memory modules (NVDIMMs). The memory controller 64 may maintain a write pending queue (WPQ) 66 (e.g., sometimes referred to as TPQ).

An application may cause a command to be issued (e.g., a MOV command) to store data in the persistent memory 65. The data may move through various levels of the multi-level cache of the CPU core 63, to the memory controller 64, and eventually to the persistent memory 65. Various commands may cause the multi-level cache of the CPU core 63 to be flushed. For example, flush cache commands (e.g., CLFLUSH), write back cache commands (e.g., CLWB), and/or bypass cache commands (e.g., BYPASS commands such as WBINVD) may cause the cause the multi-level cache of the CPU core 63 to be flushed. Non-temporal (e.g., NT) store commands may also write the CPU core 63 to the persistent memory 65, bypassing the caches. In some other systems, a speculative execution domain may only include the CPU core 63 and the L1 and L2 caches, while a power-fail protected domain may only include the memory subsystem 62 with no overlap between the speculative execution domains and the power-fail protected domains. Some embodiments may advantageously extend a speculative execution domain 67 to include the L3 cache (e.g., except for BYPASS cache commands which may be disallowed during speculative writes), and extend a power-fail protected domain 68 to include the CPU caches L1, L2, and L3, providing overlap between the two domains 67, 68. One or more of the multi-level caches L1, L2, and L3 may include an additional metadata bit per cache line as described herein to indicate whether the cache lines need to be flushed. For example, the caches may contain data from speculative execution (e.g., transactional memory) that is not meant to be persistent. Advantageously, some embodiments may include ADR technology which checks the metadata bit before flushing out the CPU caches.

Figure 7:
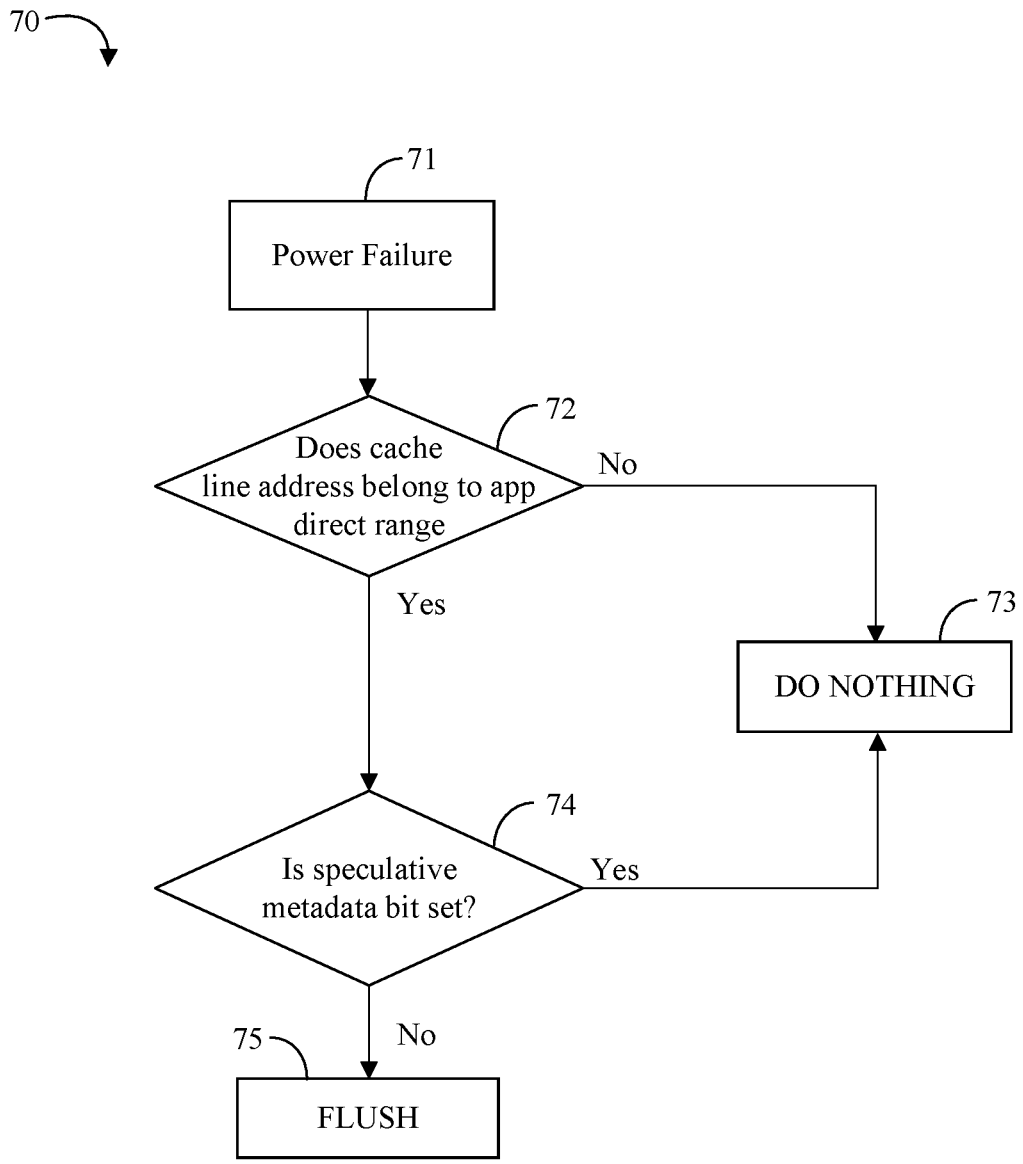
FIG. 7 is a flowchart of an example of a method of flushing a processor cache according to an embodiment.

Turning now to FIG. 7, a method 70 of flushing a processor cache may include detecting a power failure at block 71, and determining if a cache line belongs to an application direct range at block 72. If the processor cache line is determined to not belong to the application direct range at block 72, the method 70 may take no further action at block 73. If the processor cache line is determined to belong to the application direct range at block 72, the method 70 may next determine if a speculative metadata bit associated with the processor cache line is set at block 74. If the speculative metadata bit is determined to be set, the method 70 may take no further action at block 73. If the speculative metadata bit is not set, the method 70 may proceed to flush the processor cache line to persistent memory at block 75. Advantageously, in some embodiments the additional check at block 74 may enable transactional memory technology for persistent memory regions.

Additional Notes and Examples

Example 1 may include an electronic processing system, comprising a processor, persistent memory communicatively coupled to the processor, and logic communicatively coupled to the processor to track a modification to a cache line of the processor, and set an indicator to indicate if the modification relates to a transaction.

Example 2 may include the system of Example 1, wherein the logic is further to detect a power transition, and flush the processor cache line to the persistent memory based on a state of the indicator, in response to the detected power transition.

Example 3 may include the system of Example 1, wherein the logic is further to set the indicator to indicate if the modification relates to a speculative execution corresponding to the transaction.

Example 4 may include the system of Example 3, wherein the logic is further to detect a power transition, determine if an address of the processor cache line corresponds to an application direct address range, in response to the detected power transition, and flush the processor cache line to the persistent memory based on a state of the indicator, if the processor cache line address is determined to correspond to the application direct address range.

Example 5 may include the system of any of Examples 1 to 4, wherein the indicator comprises a bit of the processor cache line.

Example 6 may include the system of any of Examples 1 to 4, wherein the transaction corresponds to a transactional memory transaction.

Example 7 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to track a modification to a processor cache line, and set an indicator to indicate if the modification relates to a transaction.

Example 8 may include the apparatus of Example 7, wherein the logic is further to detect a power transition, and flush the processor cache line to persistent memory based on a state of the indicator, in response to the detected power transition.

Example 9 may include the apparatus of Example 7, wherein the logic is further to set the indicator to indicate if the modification relates to a speculative execution corresponding to the transaction.

Example 10 may include the apparatus of Example 9, wherein the logic is further to detect a power transition, determine if an address of the processor cache line corresponds to an application direct address range, in response to the detected power transition, and flush the processor cache line to persistent memory based on a state of the indicator, if the processor cache line address is determined to correspond to the application direct address range.

Example 11 may include the apparatus of any of Examples 7 to 10, wherein the indicator comprises a bit of the processor cache line.

Example 12 may include the apparatus of any of Examples 7 to 10, wherein the transaction corresponds to a transactional memory transaction.

Example 13 may include a method of tracking a cache line modification, comprising tracking a modification to a processor cache line, and setting an indicator to indicate if the modification relates to a transaction.

Example 14 may include the method of Example 13, further comprising detecting a power transition, and flushing the processor cache line to persistent memory based on a state of the indicator, in response to the detected power transition.

Example 15 may include the method of Example 13, further comprising setting the indicator to indicate if the modification relates to a speculative execution corresponding to the transaction.

Example 16 may include the method of Example 15, further comprising detecting a power transition, determining if an address of the processor cache line corresponds to an application direct address range, in response to the detected power transition, and flushing the processor cache line to persistent memory based on a state of the indicator, if the processor cache line address is determined to correspond to the application direct address range.

Example 17 may include the method of any of Examples 13 to 16, wherein the indicator comprises a bit of the processor cache line.

Example 18 may include the method of any of Examples 13 to 16, wherein the transaction corresponds to a transactional memory transaction.

Example 19 may include at least one computer readable medium, comprising a set of instructions, which when executed by a computing device, cause the computing device to track a modification to a processor cache line, and set an indicator to indicate if the modification relates to a transaction.

Example 20 may include the at least one computer readable medium of Example 19, comprising a further set of instructions, which when executed by the computing device, cause the computing device to detect a power transition, and flush the processor cache line to persistent memory based on a state of the indicator, in response to the detected power transition.

Example 21 may include the at least one computer readable medium of Example 19, comprising a further set of instructions, which when executed by the computing device, cause the computing device to set the indicator to indicate if the modification relates to a speculative execution corresponding to the transaction.

Example 22 may include the at least one computer readable medium of Example 21, comprising a further set of instructions, which when executed by the computing device, cause the computing device to detect a power transition, determine if an address of the processor cache line corresponds to an application direct address range, in response to the detected power transition, and flush the processor cache line to persistent memory based on a state of the indicator, if the processor cache line address is determined to correspond to the application direct address range.

Example 23 may include the at least one computer readable medium of any of Examples 19 to 22, wherein the indicator comprises a bit of the processor cache line.

Example 24 may include the at least one computer readable medium of any of Examples 19 to 22, wherein the transaction corresponds to a transactional memory transaction.

Example 25 may include a memory apparatus, comprising means for tracking a modification to a processor cache line, and means for setting an indicator to indicate if the modification relates to a transaction.

Example 26 may include the apparatus of Example 25, further comprising means for detecting a power transition, and means for flushing the processor cache line to persistent memory based on a state of the indicator, in response to the detected power transition.

Example 27 may include the apparatus of Example 25, further comprising means for setting the indicator to indicate if the modification relates to a speculative execution corresponding to the transaction.

Example 28 may include the apparatus of Example 27, further comprising means for detecting a power transition, means for determining if an address of the processor cache line corresponds to an application direct address range, in response to the detected power transition, and means for flushing the processor cache line to persistent memory based on a state of the indicator, if the processor cache line address is determined to correspond to the application direct address range.

Example 29 may include the apparatus of any of Examples 25 to 28, wherein the indicator comprises a bit of the processor cache line.

Example 30 may include the apparatus of any of Examples 25 to 28, wherein the transaction corresponds to a transactional memory transaction.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
 a processor;
 persistent memory communicatively coupled to the processor; and
 logic communicatively coupled to the processor to:
  track a modification to a cache line of the processor;
  set an indicator to indicate if the modification relates to a transaction, and set the indicator to indicate if the modification relates to a speculative execution corresponding to the transaction;
  detect a power transition;
  determine if an address of the processor cache line corresponds to an application direct address range, in response to the detected power transition; and
  flush the processor cache line to the persistent memory based on a state of the indicator indicating whether the modification relates to a speculative execution and in response to the detected power transition.

2. The system of claim 1, wherein the logic is further to:
 flush the processor cache line to the persistent memory based on a state of the indicator indicating whether the modification relates to a speculative execution and in response to the detected power transition, if the processor cache line address is determined to correspond to the application direct address range.

3. The system of claim 1, wherein the indicator comprises a bit of the processor cache line.

4. The system of claim 1, wherein the transaction corresponds to a transactional memory transaction.

5. A semiconductor package apparatus, comprising:
 one or more substrates; and
 logic coupled to the one or more substrates, wherein the logic is at least partly implemented in one or more of configurable logic and fixed-functionality hardware logic, the logic coupled to the one or more substrates to:
  track a modification to a processor cache line;
  set an indicator to indicate if the modification relates to a transaction, and set the indicator to indicate if the modification relates to a speculative execution corresponding to the transaction;
  detect a power transition;
  determine if an address of the processor cache line corresponds to an application direct address range, in response to the detected power transition; and
  flush the processor cache line to the persistent memory based on a state of the indicator indicating whether the modification relates to a speculative execution and in response to the detected power transition.

6. The apparatus of claim 5, wherein the logic is further to:
 flush the processor cache line to persistent memory based on a state of the indicator indicating whether the modification relates to a speculative execution and in response to the detected power transition, if the processor cache line address is determined to correspond to the application direct address range.

7. The apparatus of claim 5, wherein the indicator comprises a bit of the processor cache line.

8. The apparatus of claim 5, wherein the transaction corresponds to a transactional memory transaction.

9. A method of tracking a cache line modification, comprising:
 tracking a modification to a processor cache line;
 setting an indicator to indicate if the modification relates to a transaction, and setting the indicator to indicate if the modification relates to a speculative execution corresponding to the transaction;
 detecting a power transition;
 determining if an address of the processor cache line corresponds to an application direct address range, in response to the detected power transition; and
 flushing the processor cache line to the persistent memory based on a state of the indicator indicating whether the modification relates to a speculative execution and in response to the detected power transition.

10. The method of claim 9, further comprising:
 flushing the processor cache line to persistent memory based on a state of the indicator indicating whether the modification relates to a speculative execution and in response to the detected power transition, if the processor cache line address is determined to correspond to the application direct address range.

11. The method of claim 9, wherein the indicator comprises a bit of the processor cache line.

12. The method of claim 9, wherein the transaction corresponds to a transactional memory transaction.

13. At least one non-transitory computer readable medium, comprising a set of instructions, which when executed by a computing device, cause the computing device to:
- track a modification to a processor cache line; and
- set an indicator to indicate if the modification relates to a transaction, and set the indicator to indicate if the modification relates to a speculative execution corresponding to the transaction;
- detect a power transition;
- determine if an address of the processor cache line corresponds to an application direct address range, in response to the detected power transition; and
- flush the processor cache line to the persistent memory based on a state of the indicator indicating whether the modification relates to a speculative execution and in response to the detected power transition.

14. The at least one non-transitory computer readable medium of claim 13, comprising a further set of instructions, which when executed by the computing device, cause the computing device to:
- flush the processor cache line to persistent memory based on a state of the indicator indicating whether the modification relates to a speculative execution and in response to the detected power transition, if the processor cache line address is determined to correspond to the application direct address range.

15. The at least one non-transitory computer readable medium of claim 13, wherein the indicator comprises a bit of the processor cache line.

16. The at least one non-transitory computer readable medium of claim 13, wherein the transaction corresponds to a transactional memory transaction.

* * * * *